(12) United States Patent
Franzreb et al.

(10) Patent No.: US 7,691,264 B2
(45) Date of Patent: Apr. 6, 2010

(54) SEMIPERMEABLE MEMBRANE SYSTEM FOR MAGNETIC PARTICLE FRACTIONS

(75) Inventors: Matthias Franzreb, Karlsruhe (DE); Tilmann Rogge, Heidelberg (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 117 days.

(21) Appl. No.: 11/705,337

(22) Filed: Feb. 12, 2007

(65) Prior Publication Data

US 2008/0035541 A1    Feb. 14, 2008

Related U.S. Application Data

(63) Continuation-in-part of application No. PCT/EP2005/013426, filed on Dec. 14, 2005.

(30) Foreign Application Priority Data

Dec. 24, 2004    (DE) .................. 10 2004 062 535

(51) Int. Cl.
*B01D 35/06* (2006.01)
(52) U.S. Cl. ............... 210/223; 210/222; 210/695; 210/650
(58) Field of Classification Search ......... 210/167.03, 210/167.29, 503, 695, 222, 257.2, 195.2, 210/650, 416.1, 223, 767, 195.1
See application file for complete search history.

(56) References Cited

U.S. PATENT DOCUMENTS

| | | | | |
|---|---|---|---|---|
| 3,477,948 A | * | 11/1969 | Inoue | 210/695 |
| 4,124,503 A | * | 11/1978 | Watson | 210/695 |
| 4,249,994 A | * | 2/1981 | Dolle | 376/315 |
| 5,238,577 A | * | 8/1993 | Newsom | 210/695 |
| 6,217,773 B1 | * | 4/2001 | Graham | 210/651 |
| 7,410,574 B2 | * | 8/2008 | Hammond | 210/222 |
| 2003/0168408 A1 | | 9/2003 | Rajagopalan et al. | |
| 2004/0173531 A1 | * | 9/2004 | Hammond | 210/650 |
| 2007/0068870 A1 | * | 3/2007 | Johnson et al. | 210/645 |

FOREIGN PATENT DOCUMENTS

WO    WO 01/85295    11/2001
WO    WO 2004/078306    9/2004

* cited by examiner

*Primary Examiner*—Tony G Soohoo
*Assistant Examiner*—David C Mellon
(74) *Attorney, Agent, or Firm*—Klaus J. Bach

(57) ABSTRACT

In a semi-permeable membrane system for transferring magnetic particle fractions contained in a first fluid to a second fluid, comprising a membrane through which passages extend and which separates the first fluid from the second fluid being a pressure generation arrangement is provided for generating a reversible pressure differential between the two fluids across the membrane for alternately causing fluid movement in the membrane in opposite directions and a magnetic field generator is provided for alternately generating a magnetic field in the membrane wherein, during the fluid movement in one direction, the magnetic field is switched on to hold the magnetic particles in place in the membrane and, during fluid flow in the opposite flow direction, the magnetic field is switched off to permit the magnetic particles to be moved through the membrane in the other direction.

12 Claims, 3 Drawing Sheets

SEMIPERMEABLE MEMBRANE SYSTEM FOR MAGNETIC PARTICLE FRACTIONS

This is a Continuation-In-Part Application of pending International Application PCT/EP2005/013426 filed Dec. 14, 2005 and claiming the priority of German Application 10 2004 062 535.2 filed Dec. 24, 2004.

BACKGROUND OF THE INVENTION

The invention resides in a semi-permeable membrane for magnetic particle fractions in a fluid having two membrane surface forming a separation structure between two fluid fractions and at least one channel bridging the membrane.

A membrane of this type is in contrast to vibrating membranes—a separation membrane—which forms a separation layer between two fluid volumes. A semi-permeable (osmotic) membrane is only permeable by certain materials or components of a fluid whereas, it forms an impermeable barrier for other materials. This selective material exchange, also called osmosis, can occur in both directions (diosmosis) or, as in the present case, in one direction (endosmosis).

Semi-permeable membranes are, for example, necessary components for life. Each biological cell is surrounded by a semi-permeable membrane, that is, a membrane which is permeable only for certain substances.

Semi-permeable membranes are also suitable for technical separation methods. An overview over membrane methods as well as over membrane methods with semi-permeable membranes is provided in chapter "Membranes and Membrane Separation Process", Ullmann's Encyclopedia of Industrial Chemistry Wiley-VCH Verlag, 2002.

An embodiment as shown in this publication which is used in electrodialysis procedures is based on a combination of an electric field and a semi-permeable membrane. With the application of a magnetic field, a flow of ions through the semi-permeable ion exchanger membrane in a certain direction is established. These membranes ideally permit the passage of ions of a certain charge type whereas ions of the opposite charge type are prevented from passing. For example, cat-ions may pass a cat-ion exchanger membrane whereas an-ions are fully blocked. By a combination of a driving force (electric field, pressure, etc. . . . ) and a semi-permeable membrane, a continuous separation of a substance against a concentration differential is therefore possible.

Further semi-permeable membranes for endosmotic methods are based on the utilization of hydrophilic and hydrophobic material properties and concern for example the selective removal of organic compounds from aqueous solutions via so-called per-vaporation membranes. The organic compounds pass through the hydrophobic membrane from one side thereof and are vaporized on the other side of the membrane whereas water is blocked from passing through the membrane.

The selection features of the materials to be separated are based therefore on the electric charges (positive or negative) or hydrophilic or hydrophobic properties, which limits the use possibilities of a technical endosmosis to certain material groups.

In order to expand the apparent selectivity of a membrane the above publication proposes a combination of this substance with another substance or the bonding of this substance to a carrier particle. For example, charge-free molecules can be prepared by a chemical reaction with a charged molecule for an endosmosis based on the mentioned electrostatic effects. On the other hand, the bonding of substances to macromolecules or particles is often utilized to make the larger bond structure formed in this way impassable for membranes which are only permeable for small particle sizes (Nano-, ultra-, or ultrafiltrations) and to concentrate them whereas the surrounding solution passes through the membrane because of a pressure gradient. However, the last example differs from the previously described membrane method in that the desired substance is retained and does not pass the membrane that is the desired substance remains in the original solution medium, though in concentrated from. In the method with a semi-permeable membrane, in contrast, the desired substance passes through the membrane and into the medium disposed at the other side of the membrane. The medium at the permeate side of the membrane may differ from the medium at the feed or, respectively, the retentate side, for example, in the pH value and the salt content or it may consist of a completely different solvent such as, for example, ethanol. With pervaporation, even a change-over from a liquid to a gaseous medium occurs. The medium change-over provides for substantially wider chemical engineering application possibilities than simple concentrating via size-selective membranes.

More diverse than size-selective membranes are functionalized membranes which are solid phases in membrane form which are effective by adsorption. For this purpose, polymer membranes, which are effective on the basis of a defined pore distribution by size exclusion are functionalized in a further step. Another possibility resides, for example, in pressing or weaving fiber-like sorption materials into membrane form. If a medium then flows through these membranes, certain substances are retained by sorption by the functional groups. The membranes act in principle like a very flat sorption filter. As a result of a large flow cross-section which can be provided thereby, a sufficient flow volume can be obtained even at low flow speeds. However, with the sorption principle the binding capacity limit is reached relatively rapidly and the flow must then be stopped to avoid a breakthrough. Subsequently, the sorptive membrane must be regenerated in a separate step which occurs generally by elution of the previously retained substances. In this way, the substances can be transferred—like with regular semi-permeable membranes—to a different solvent. However, in contrast to the continuous method of regular semi-permeable membranes, membranes operating on a sorption basis require a cyclic discontinuous operation.

If it would be possible to provide for a selection of permeable and non-permeable substances in a much more variable and specific way, a wide application area would be available in the chemical and bio-technical industry.

It is therefore the object of the present invention to provide a semi-permeable membrane system which can be used for an endosmosis for magnetic particle fractions, that is, which acts as a semi-permeable barrier in connection with magnetic particles. This system is intended to provide for a continuous passage of magnetic particles through the membrane so that the magnetic particles travel from one fluid at one side of the membrane to another fluid at the opposite side of the membrane.

SUMMARY OF THE INVENTION

In a semi-permeable membrane system for separating magnetic particle fractions from a mixture contained in a first fluid, comprising a membrane with opposite membrane surfaces between which passages extend and which separates the first fluid from a second fluid each of which is in contact with one of the membrane surfaces, means are provided for generating a reversible pressure differential between the two fluids across the membrane for alternately causing a fluid flow through the membrane in opposite directions and means for alternately generating and eliminating a magnetic field in the membrane so that, during the fluid flow in one direction, the magnetic field is switched on to hold the magnetic particles in place in the membrane and, during fluid flow in the opposite flow direction, the magnetic field is switched off to permit the magnetic particles to be moved through the membrane in the other direction.

The membrane represents a separation wall between the two fluids but is basically permeable for the fluids. The fluids comprise suspensions of magnetic microparticle fractions with particle sizes which, geometrically, permit the passage of the particles through the passages in the membrane, that is, the largest particles are still smaller than passage opening cross-sections.

During the operation of the membrane system, the switching positions mentioned above are cyclically changed-over such that a fluid flow in the channels is generated. The means are effective at the two fluids at opposite sides of the membrane preferably by increases or reductions of the pressure effective on one of the fluids for generating a pressure difference across the membrane. The means may include in connection with stagnant fluids (without inlets or outlets at opposite sides of the membrane) actuators for generating a pressure increase or pressure inputs or, in the case of moving fluids (with inlets and outlets at opposite sides of the membrane), valve operated flow control. With moving fluids, the fluid flow past the membrane surfaces may be established in a parallel, counter-current or cross-current flow pattern.

In a particular switching position, the magnetic field is established in the channels in such a way that the magnetic field lines cross the channels. As a result a magnetic force is effective on the magnetic particles present in the channels which biases them preferably toward a wall of the channels and, consequently, inhibits their further transport in the fluid flow in the channels.

This effect can be increased if the membrane, and particularly the channel walls, consist fully or partially of a magnetic material. The activated magnetic field focuses itself, as a result, in the area of the membrane in the manner as described below. Furthermore, the magnetically excited wall acts like the poles of a magnet on the magnetic particle fractions and significantly increases the forces effective on the particles and, consequently, the adhesion of the particles to the wall. The membrane comprises preferably several flat layers of a solid magnetic material through which a fluid can flow and which are stacked on top of one another in alternating order and between the two membrane surfaces.

The material through which the fluid flows comprises preferably a disordered wire web, an orderly wire web, tubes, particle granulate or a loose ball fill, each comprising a magnetic material, preferably a ferromagnetic material with soft magnetic properties. Comparably fine magnetic components form in a magnetic field local magnetic poles which generate a strong attraction force for magnetic particles. As a result, the particles are precipitated out of the medium in the area of the induced magnetic poles and accumulated on the wires.

In the other switching position, the magnetic field mentioned above is deactivated and no magnetic forces are effective on the magnetic particle fractions, which are present in the fluid in the channels, so that they are transported with the fluid flow.

The invention is particularly suitable for the selective transfer of the magnetic particle fraction to one of the fluids on one side of the membrane in such a way that a mixing of other non-magnetic components of the two fluids is practically impossible. Essential herefor is an adaptation of the cycling times of the cyclically alternating switching positions. On one hand, a particular switching position must not be maintained for such a long time that the non-magnetic components can fully pass through the membrane by way of the fluid flow in the channels, on the other hand, it must be made sure that, after a certain number of switching position reversals, a preferred accumulative direction for the magnetic components of one of the two fluids is established.

Preferably, the switching positions alternate cyclically such that the residence times of the two switching positions correspond, as to their respective sums to the ratio of the passing times for the non-magnetic components of a fluid through the membrane.

Further, the individual residence times in the two switching positions can be controlled so that the maximally possible value is provided by the above-mentioned permeation or passing times for the non-magnetic components of a fluid through the membrane.

If the non-magnetic components of the fluid at opposite sides of the membrane have similar through-flow characteristics, particularly the same through-flow characteristics and the same through flow times, the two alternating switching states may provide for the same residence times individually as well as summarized.

If the conditions concerning the cycling times of the switching position change-overs are not maintained, a net flow of non-magnetic materials from one membrane side to the other is the result. This can occur, depending on the switching position times, also in a direction opposite to the transport direction of the magnetic particle fraction, particularly if the switching position times without magnetic field substantially exceed those with the magnetic field. This net flow of a fluid in a direction opposite to the travel direction of the magnetic particles can be very advantageous for example for washing or elusion processes. Since in that case a net flow in a passing direction is desired no time limits exist in the respective switching position for a maximum residence period.

The magnetic field can be generated by electromagnets, superconductive magnet coils or switchable permanent magnets.

An interesting combination of the use of selective carrier particles and the above-mentioned membrane resides in the utilization of the above-mentioned magnetic particle fractions as micro-sorbants. Herein, the magnetic particle fractions are functionalized as carrier particles in the size range of a few micrometers or less in such a way that they bind certain substances selectively. The removal of the magnetic micro-sorbants from the surrounding solution, that is, from the remaining non-magnetic components of the fluid occurs by means of the above-mentioned separation procedures, whereby the micro-sorbants concentration is increased at one side of the membrane. Advantageously, in this way, also certain non-magnetic fluid components can be separated together with the magnetic particle fractions from other non-absorbing non-magnetic components.

With the procedure described, it is also possible, in an analog manner, to remove contamination or other undesirable materials from the mixture instead of the product. For example, with the appropriately functionalized magnetic micro-particles, specific proteases can be removed from a protein mixture. These proteases are enzymes which, if they would remain in the mixture, would result in a slow destruction of the derived proteins.

An application is for example the purification and concentrating of a valuable protein out of a mixture of numerous biomolecules such as other proteins, DNA, sugar, etc. To this end, functionalized magnetic micro-particles are used which bind the targeted protein with high selectivity. Such magnetic micro-particles are widely used in the area of the bioanalysis and medical diagnostics. The procedure for the protein purification on the basis of the membranes mentioned above is as follows:

1. Mixing the micro-particles into the mixture. As a result of the large specific surface of the micro-particles, the targeted proteins are rapidly bound in a selective way.

2. Conducting the suspension of micro-particles and protein mixture along the above-mentioned membrane. Because of the above-described semi-permeable properties of the membrane, the micro-particles can pass to the other side of the membrane whereas the solution and the undesirable biomolecules remain at the original side.

3. The membrane side to which the magnet particles move is at the same time subjected to a small-volume flow of an elution solution. The elution solution releases the targeted protein from the magnetic particles whereby the targeted protein is concentrated in the small volume flow of the elusion solution.

4. With another use of such a membrane, the regenerated magnetic particles can be separated from the eluted target protein and can again be used for the binding procedure. In addition to the procedure mentioned, other intermediate steps such as washing steps may be advisable which can also be performed, wherein also the membrane employed above may be used.

Below, the invention and various exemplary embodiments will be described in greater detail with reference to the accompanying drawings.

DESCRIPTION OF PARTICULAR EMBODIMENTS

Figure 1:
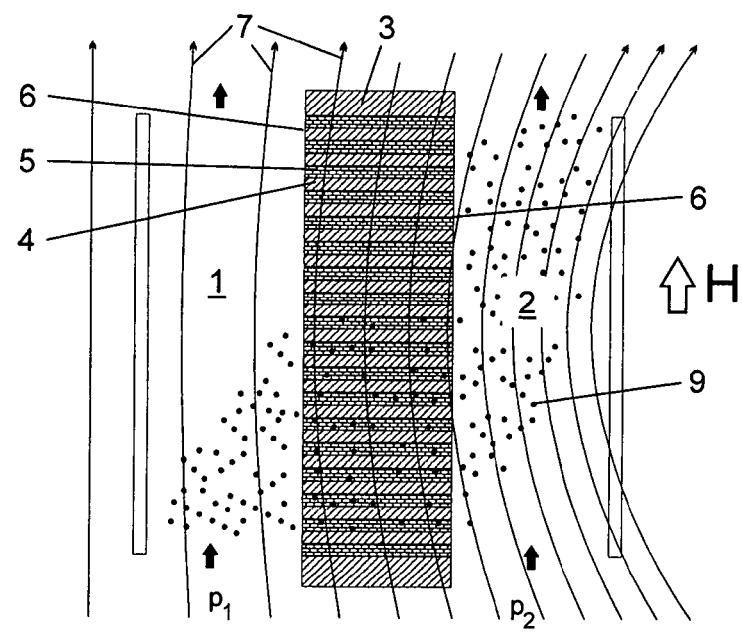
FIG. 1 shows a semi-permeable membrane system as a separation wall between two fluids.

FIG. 1 shows schematically in a cross-sectional view the essential components of a first embodiment with a plate-shaped membrane 3 forming a separation wall between two fluids 1 and 2 which are moved parallel to the membrane and have pressures P1 and, respectively, P2. The membrane comprises a sandwich structure consisting of alternate layers of a ferromagnetic solid material 4 and layers of a ferromagnetic wire web 5. The layers mentioned extend orthogonally with respect to the two membrane surfaces 6. The open spaces in the wire mesh provide the micro-fluidic channels forming the fluid passages between the two membrane surfaces. The lateral dimension of the layers, particularly of the ferromagnetic web 5 between the membrane surfaces 6 herein is a multiple of its thickness or, respectively, height. The whole magnet membrane additionally stands under the influence of a switchable magnetic field indicated in FIG. 1 by the magnetic field lines 7 (magnetic field strength H). Not shown are the means for generating a fluid flow axially to the micro-fluid channels with two switching positions corresponding to the two flow directions, that is, for generating a differential pressure which is switchable back and forth between the pressures P1 and P2.

The magnetic particles are initially suspended in one of the fluids 1 or 2. One of the two fluids flows through the micro-fluid channels under the control of the differential pressure between P1 and P2 in the direction of the pressure drop.

Figure 2:
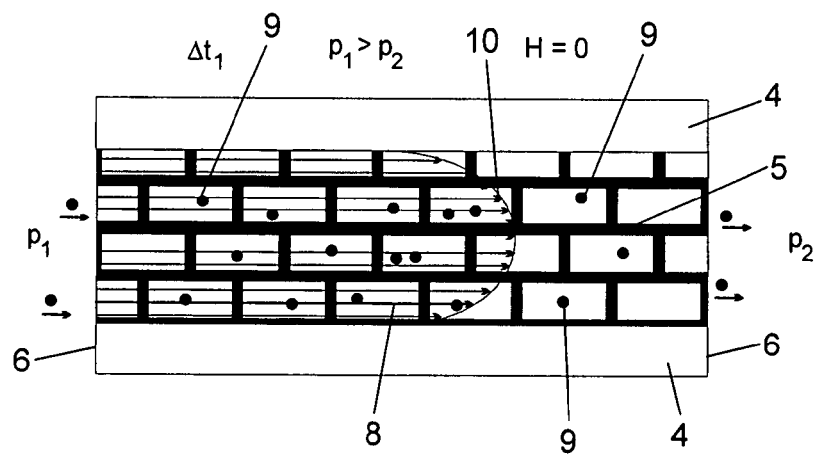
FIG. 2 shows, in a detailed cross-sectional representation, the membrane in a switching position with deactivated magnetic field.
Figure 3:
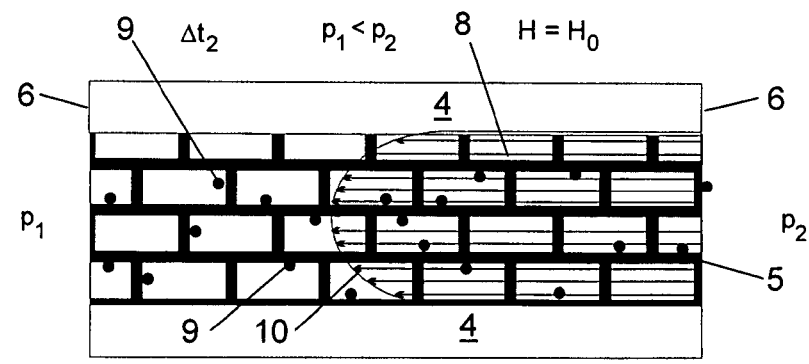
FIG. 3 is a detailed representation showing, in principle, the membrane in a switching position with the magnetic field activated.

The functioning of the magnet membrane is apparent from FIGS. 2 and 3, which show the two mentioned switching positions of the operating state of the membrane system according to FIG. 1. In each case, one layer of the wire web 5 and the two adjacent layers of the solid material 4 disposed between the two membrane surfaces 6 are shown.

In the switching position as shown in FIG. 2, the magnetic field is switched off (H=0) and the pressure P1 of the fluid is somewhat higher than the pressure P2 in the fluid 2. Because of the pressure difference $\Delta P$ (P1>P2), a fluid flow 8 through the open spaces of the ferromagnetic wire web in the direction of the fluid 2 is established. With the fluid flow also the freely suspended magnetic particles 9 are transported through the spaces formed in the wire mesh (open passage porosity).

FIG. 3 in contrast represents the other switching position of the membrane system. The magnetic field, in this case, is switched on (H>0) and the pressure P2 in the fluid 2 is somewhat higher than the pressure P1 in the fluid 1. Also, in this case, this pressure difference $\Delta P$ (P1<P2) causes a fluid flow 8 through the open spaces in the wire web, but in the opposite direction, that is, in the direction of the fluid 1. In the switching position as represented in FIG. 2 however, the suspended magnetic particles 9 are attracted by the wire mesh and are retained thereby as the magnetic field is switched on. In this switching position, the fluid flow 8 only comprises the non-magnetic components.

With a cyclical change between the two switching positions the non-magnetic particles are moved back and forth in the wire web 5 together with the fluid flow 8, whereas the magnetic particles and particles possibly attached thereto are carried along in the wire web by the fluid flow 8 only when the magnetic field is deactivated. Consequently, they move stepwise in a predetermined direction (in the present case in the direction of the fluid 2, see FIG. 2) and are concentrated in this fluid. To avoid the inflow of non-magnetic components of a fluid through the membrane into the respective other fluid the flow volume of the back and forth movement of the fluid with respect to these components must be balanced over the whole contiguous operating period.

If an inflow of non-magnetic components from the fluid 1 to the fluid 2 or vice versa by the fluid flow 8 is to be avoided the respective switching position must be interrupted before these components can leave the wire mesh 5 at the membrane surface 6. With this requirement the duration $\Delta t$ in the respective switching position is limited that is the pressure difference associated with this switching position must be either omitted ($\Delta P=0$) or the other switching position must be established that is the pressure difference must be reversed. Exceeding the duration $\Delta t$ without interruption or change of the switching position would unavoidably result in the introduction of the non-magnetic components mentioned above into the respective opposite fluid.

If the switching times and flow volume balances mentioned above are maintained, a slight mixing of the fluids 1 and 2 may occur but only in the micro-channels of the wire mesh.

The magnetic membrane system acts like a semi-permeable wall through which magnetic particles flow in a predeterminable direction, not however the non-magnetic particles of the fluids. The change-over of the switching positions occurs preferably with very high cycling frequency so that the magnetic particles pass through the magnet membrane practically continuously (quasi-continuously) and the particles are not accumulated in the membrane.

In certain cases, it may be advantageous to select the duration $\Delta t$ of the switching position with activated magnetic field (see FIG. 3) to be somewhat longer than the duration $\Delta t$ of the switching position with deactivated magnetic field (see FIG. 2). In this way, on average, a small amount of non-magnetic components will pass into the fluid 2 via the membrane 3 against the migration of the magnetic particles 9. However, if the non-magnetic component of the fluid 2 is for example a washing solution the magnetic particles are effectively washed as they pass through the wire mesh 5 of the membrane 3 in a counter-current flow.

Figure 4:
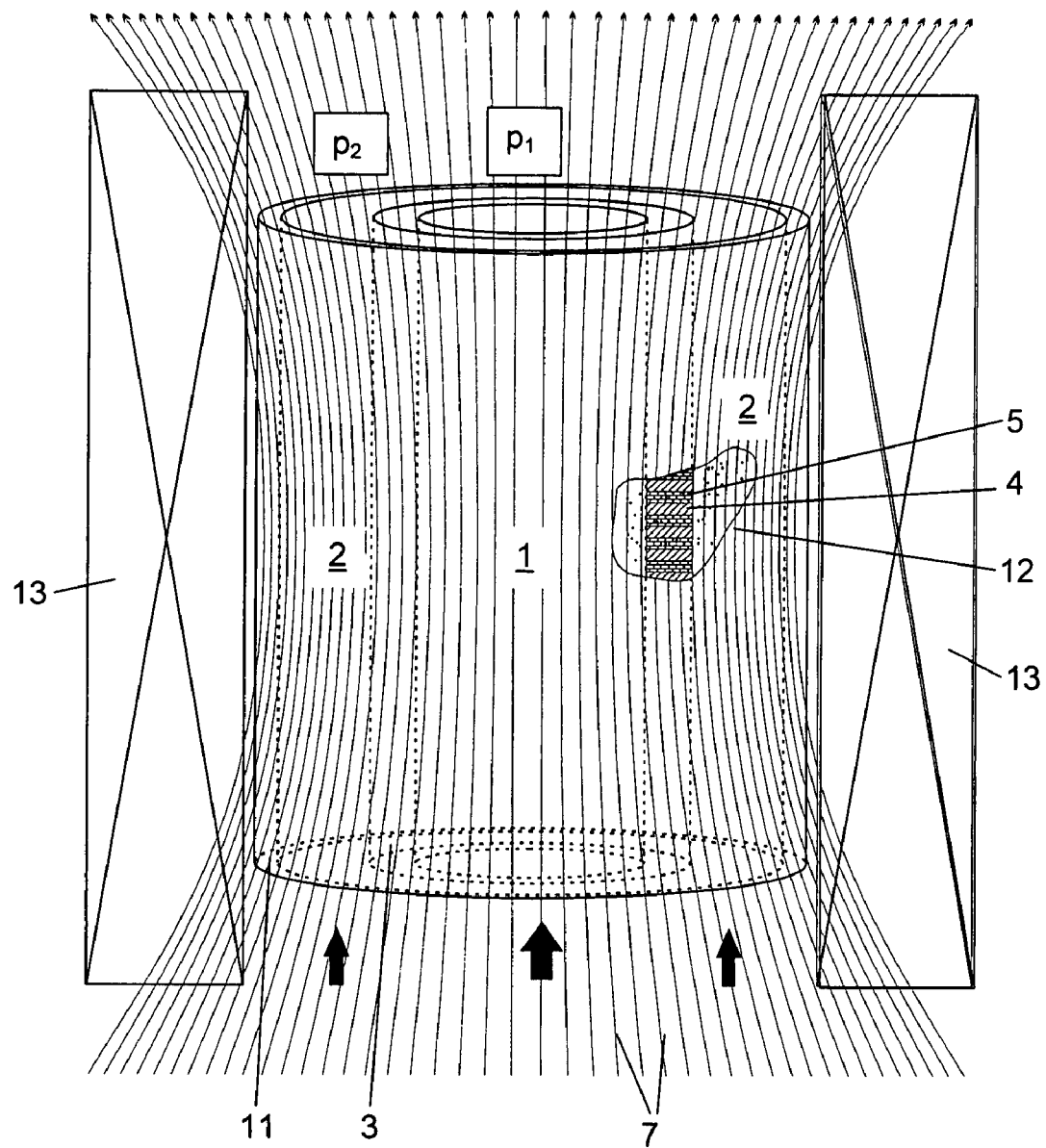
FIG. 4 shows, in principle, the essential components of a membrane system with a cylindrical membrane disposed concentrically in a cylindrical housing.

FIG. 4 shows schematically a preferred cylindrical or tubular embodiment wherein the membrane 3 is in the form of a tube section which is disposed concentrically in a tubular housing 11 whose interior volume is divided by the membrane 3 into two chambers for guiding the fluid 1,2 axially (the flow direction is indicated by arrows). The partial sectional area 12 shows a cross-section of the tubular membrane 3 formed by rings of layers of soft magnetic solid material 4 and wire mesh 5. For generating the required magnetic field, a coil 13 of an electromagnet is arranged outside the housing 11. The coil 13 generates in the interior of the housing 11 a rotationally symmetric field whose magnetic field lines 7 act on the aforementioned soft magnetic components of the membrane in such a way that, beside the axial field gradients (in the direction of the longitudinal coil axis) also slight magnetic field inhomogeneities in radial direction occur. The radial inhomogeneities are such that the magnetic field in the housing 11 becomes stronger in the direction toward the inner coil wall, that is, in outward direction toward the housing 11 (in FIG. 4 shown by an increase of the field line density). That is, the magnetic materials such as the magnetic particles present within the housing are therefore subjected to force effects not only in axial direction (direction of the longitudinal coil axis), but also in radial direction (axially outwardly following the increasing field line density).

The particle-containing fluid 1 is preferably admitted to the interior of the tubular membrane 3 axially as indicated by an arrow. The fluid 2 flows through the area between the outer membrane surface of the membrane 3 and the inner surface of the tubular housing 11 (flow direction indicated by arrows). During operation, the magnetic particles move preferably axially outwardly, that is from fluid 1 to fluid 2 as provided for by the switching positions, through the membrane as explained earlier because of the additional magnetic axial force components.

Figure 5:
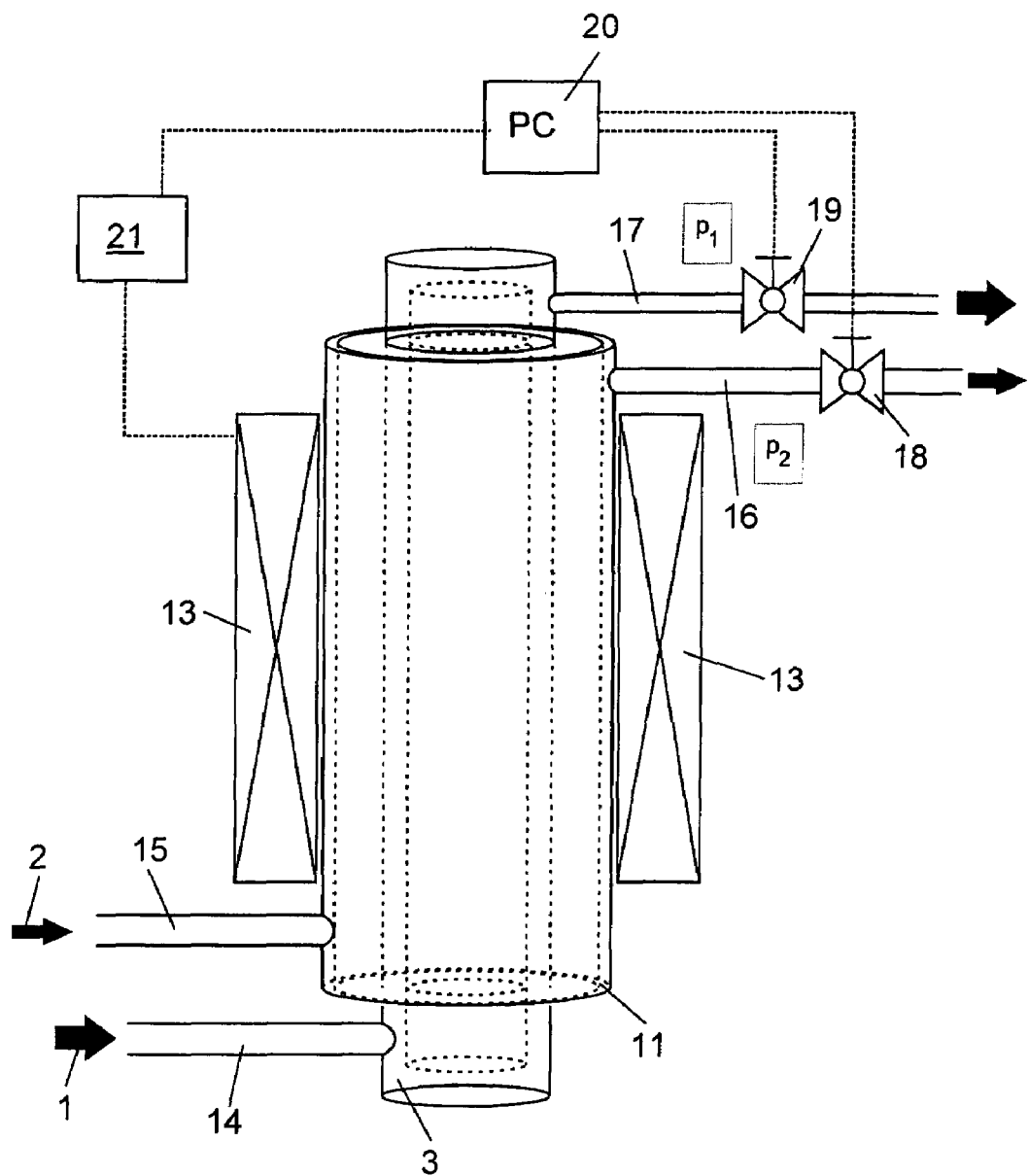
FIG. 5 shows the overall membrane system for the embodiment according to FIG. 4.

FIG. 5 is a schematic representation of the embodiment according to FIG. 4 showing the means for generating a pressure differential between the fluids 1 and 2 and the peripheral components required for an operation. The membrane 3 and the housing 11 are tube members which are closed at their opposite axial ends and are arranged concentrically. The fluid-permeable components of the membrane such as the wire mesh are arranged exclusively within the housing. The parts of the cylinder membrane projecting from the housing are provided only for fluid connections.

The fluids 1 and 2 are introduced into the interior of the cylindrical membrane 3 or, respectively, the housing 11 and are conducted out of the cylindrical membrane 3 or, respectively, the housing 11 via the discharge passages 16 or, respectively, 17 to throttle valves 18 or, respectively, 19 for generating back pressures in the semi-permeable membrane system corresponding to P1 or, respectively, P2. Different backup pressures cause a fluid flow through the membrane. The throttle valves 18 and 19 are controlled by a control unit 20 preferably a process computer or a PC and therefore are essential components of the means for generating an axial fluid flow through the micro-fluid channels with two switching positions controlling the two flow directions. The control unit is also used for the activation or deactivation of the electromagnet 13 via an intermediate amplifier unit 21 (for example, network apparatus) corresponding to the two mentioned switching positions (see FIGS. 2 and 3). By including a control software into the control unit 20, the two switching positions can be set to automatically operate the system with high cycling frequency.

What is claimed is:

1. A semi-permeable membrane system for transferring a magnetic particle fraction contained in a first fluid, to a second fluid comprising:
   a) a membrane (3) having opposite membrane surfaces (6) and forming a separation wall between the two fluids (1, 2) in contact with the opposite membrane surfaces (6), the membrane including at least one passage extending thereacross between the opposite membrane surfaces so as to bridge the membrane (6),
   b) means for alternately generating a pressure differential between the two fluids at opposite sides of the membrane (3) so as to provide for alternating fluid flow in opposite axial directions of the at least one passage and having two switching positions corresponding to the two flow directions across the membrane (16), and
   c) means for generating a magnetic field in said at least one passage, said magnetic field generating means being switchable for establishing the magnetic field during fluid flow in one direction and eliminating the magnetic field during fluid flow in the opposite direction,
   d) the switching positions being changeable cyclically between a first on position wherein the magnetic field is switched on and the magnetic particles are not carried along with the fluid flow in the membrane and a second off position in which the magnetic field is switched off and the magnetic particles are moved with the fluid flow thereby moving the magnetic particles stepwise through the membrane from the first fluid to the second fluid.

2. A semi-permeable membrane as claimed in claim 1, wherein the magnetic field comprises magnetic field lines (7) which cross said at least one passage.

3. A semi-permeable membrane as claimed in claim 1, wherein the membrane (3) comprises a magnetic material.

4. A semi-permeable membrane as claimed in claim 3, wherein the membrane (3) comprises several layers disposed on top of one another and consisting of a permeable material forming said passages and a solid magnetizable material (4) arranged alternately in a stack so as to bridge the two membrane surfaces (6).

5. A semi-permeable membrane as claimed in claim 4, wherein the permeable material comprises a wire mesh (5) consisting of a magnetizable material.

6. A semi-permeable membrane as claimed in claim 1, wherein the means for generating a fluid flow comprises at least one actuator for generating a pressure difference between the two fluid fractions, that is, a pressure increase or pressure impulse in at least one of the fluid fractions.

7. A semi-permeable membrane as claimed in claim 1, wherein the two fluid fractions are fluids (1, 2) flowing in parallel relationship along the opposite membrane surfaces (6).

8. A semi-permeable membrane as claimed in claim 7, wherein the means for generating the pressure differential includes at least one throttle valve (18, 19) for at least one of the fluid (1, 2).

9. A semi-permeable membrane as claimed in claim 1, wherein the means for generating the magnetic field includes at least one of an electromagnet (13) a superconductive magnetic coil, and a switchable permanent magnet.

10. A semi-permeable membrane as claimed in claim 1, wherein the membrane (3) comprises a tube section disposed concentrically in a tubular housing (11) in spaced relationship therefrom wherein one of the fluids is conducted through the tube section and the other through the space between the tube section and the housing.

11. A semi-permeable membrane as claimed in claim 10, wherein the magnetic field is established rotationally symmetrically in the interior of the housing.

12. A semi-permeable membrane as claimed in claim 1, wherein a control unit with a processor is provided for controlling the means for generating the magnetic field.

* * * * *